(12) United States Patent
Edelmann et al.

(10) Patent No.: US 10,527,090 B2
(45) Date of Patent: Jan. 7, 2020

(54) WHEEL BEARING UNIT AND PRE-ASSEMBLY METHOD

(71) Applicant: Aktiebolaget SKF, Gothenburg (SE)

(72) Inventors: Ludwig Edelmann, Sulzthal (DE); Dominic Namyslo, Gädheim (DE); Matthias Schuler, Stadtlauringen (DE); Johannes Zang, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/124,330

(22) Filed: Sep. 7, 2018

(65) Prior Publication Data
US 2019/0178287 A1    Jun. 13, 2019

(30) Foreign Application Priority Data

Dec. 8, 2017   (DE) .......................... 10-2017-222310

(51) Int. Cl.
*F16C 33/78*   (2006.01)
*F16C 19/38*   (2006.01)

(52) U.S. Cl.
CPC .......... *F16C 19/38* (2013.01); *F16C 33/7803* (2013.01); *F16C 2326/02* (2013.01)

(58) Field of Classification Search
CPC .................................................... F16C 33/768
See application file for complete search history.

(56) References Cited

U.S. PATENT DOCUMENTS

| 6,126,322 A * | 10/2000 | Otsuki ................... F16C 19/386 277/573 |
| 6,729,626 B2 * | 5/2004 | Ruetter ................. F16C 33/768 277/572 |
| 8,777,492 B2 * | 7/2014 | Yamamoto ............ B60B 27/001 301/105.1 |
| 8,956,054 B2 * | 2/2015 | Niebling ............... F16C 33/585 384/544 |
| 9,701,159 B2 * | 7/2017 | Duch ................... B60B 27/0073 |
| 2010/0002971 A1 * | 1/2010 | Hosaka ................ F16C 19/386 384/486 |
| 2010/0209031 A1 * | 8/2010 | Kaneko .................. B60B 27/00 384/448 |
| 2011/0206312 A1 * | 8/2011 | Schumacher ......... B60B 27/001 384/624 |
| 2012/0098208 A1 * | 4/2012 | Yamamoto ............... F16J 15/14 277/549 |

* cited by examiner

*Primary Examiner* — Thomas R Hannon
(74) *Attorney, Agent, or Firm* — Garcia-Zamor Intellectual Property Law, LLC; Ruy Garcia-Zamor; Bryan Peckjian

(57) ABSTRACT

A wheel bearing unit includes an outer ring and first and second inner rings and a plurality of rolling elements disposed between the inner and outer rings. At least one of the inner rings has an annular groove formed between an axially outer end of its radially outer surface a radially outer end of its outwardly facing axial end. A seal element such as an O-ring is mounted in the annular groove, and the O-ring is configured and mounted such that a first portion thereof extends axially outwardly of the first outwardly facing axial end and a second portion of the O-ring extends radially outwardly of the radially outer surface.

13 Claims, 2 Drawing Sheets

WHEEL BEARING UNIT AND PRE-ASSEMBLY METHOD

CROSS-REFERENCE

This application claims priority to German patent application no. 10 2017 222 310.3 filed on Dec. 8, 2017, the contents of which are fully incorporated herein by reference.

TECHNOLOGICAL FIELD

The disclosure is directed to a wheel bearing unit having a first inner ring and at least one second inner ring with a recess and to a preassembly method involving the wheel bearing unit.

BACKGROUND

A truck wheel bearing unit that includes two inner rings and an outer ring is known. Such a wheel bearing unit is delivered to customers with a loosely attached O-ring for sealing the wheel bearing unit to a structure on which it is mounted. When assembled, the O-ring is disposed in a recess in an axial end face of the axially inner inner-ring at a radially inner region such that, in a fully assembled state, the O-ring abuts both on the axially inner-lying inner ring and on a shoulder of a journal on which the bearing unit is applied. In this manner, the O-ring seals in a manner that substantially prevents the penetration of dirt and water onto the bearing seat.

SUMMARY

An aspect of the present disclosure comprises achieving an efficient sealing.

The disclosure relates to a wheel bearing unit including a first inner ring and at least one second inner ring, which second inner ring includes at least one recess.

According to the present disclosure, the recess is disposed directly on a radially outer lying edge of the second inner ring. An efficient sealing can thereby be achieved. In particular it can be achieved that a seal element is preinstallable on the second inner ring. Furthermore, it can be achieved in particular that in a final assembly the seal element is not forgotten or incorrectly mounted. In comparison to the prior art, there is furthermore the advantage that a seal element having a thinner cross-section can be used so that costs are saved. Furthermore it can be achieved in particular that an end side of the second inner ring, which end side abuts against a surface region of a journal after a final assembly, and the surface region are also protected against corrosion.

Another aspect of the present disclosure comprises a wheel bearing unit that has an outer ring having a radially inner surface and a first outwardly facing axial end and a second outwardly facing axial end; a first inner ring having a first outwardly facing axial end at the first outwardly facing axial end of the outer ring, an inwardly facing axial end and a radially outer surface; and a second inner ring having a second axially outwardly facing axial end at the second outwardly facing axial end of the outer ring, an axially inwardly facing axial end opposed to the axially inwardly facing axial end of the first inner ring and a radially outer surface. The unit includes a first plurality of rolling elements disposed between the outer ring and the first inner ring and a second plurality of rolling elements disposed between the outer ring and the second inner ring, and an annular groove is formed between an axially outer end of the radially outer surface of the first inner ring and a radially outer end of the first outwardly facing axial end of the first inner ring. An O-ring mounted in the annular groove, and the O-ring is configured and mounted such that a first portion thereof extends axially outwardly of the first axially outwardly facing axial end and a second portion thereof extends radially outwardly of the radially outer surface of the first inner ring. The unit may include an L-shaped metal bracket that extends radially outwardly from the radially outer surface of the first inner ring and that at least partially overlies the second portion of the O-ring and compressing the O-ring. Also, a bearing assembly formed by mounting the wheel bearing unit on a shaft having a shoulder such that the first portion of the O-ring is compressed between the shoulder and the groove.

Further advantages will become apparent from the following description of the drawings. An exemplary embodiment of the disclosure is depicted in the drawings. The drawings, the description, and the claims contain numerous features in combination. The person skilled in the art will also advantageously consider the features individually and in further meaningful combinations.

DETAILED DESCRIPTION

Figure 1:
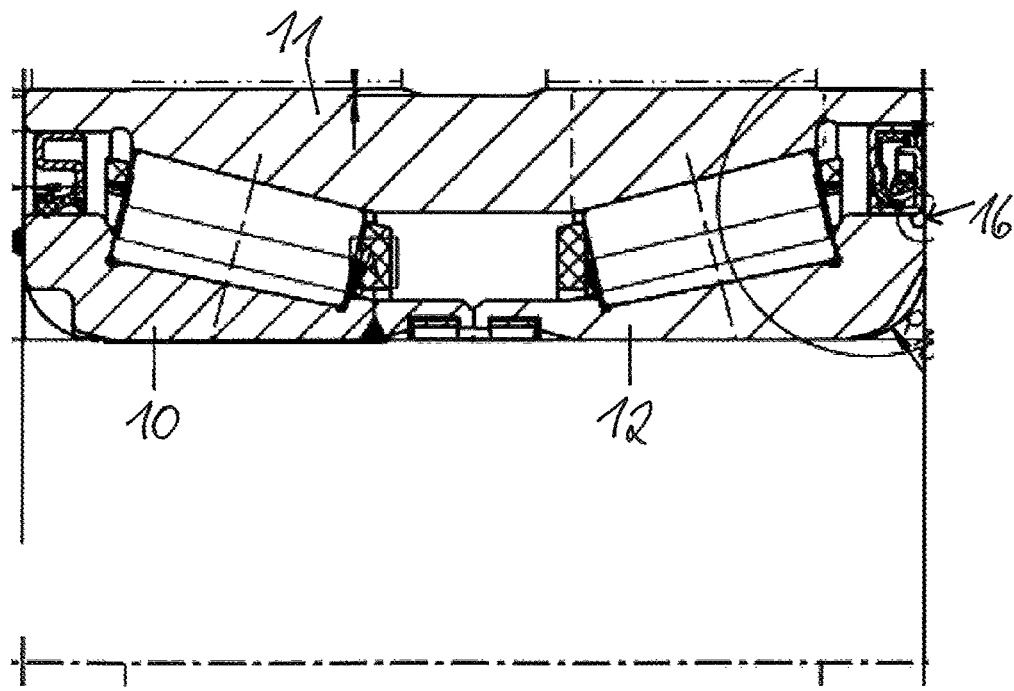
FIG. 1 is an axial section through a wheel bearing unit according to the present disclosure.
Figure 2:
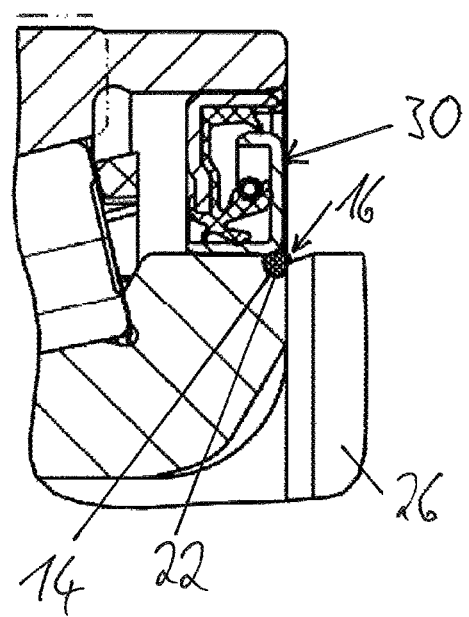
FIG. 2 is an enlarged detail from FIG. 1, wherein the wheel bearing unit of FIG. 1 is disposed on a journal.

FIG. 1 shows an axial section through a wheel bearing unit according to the present disclosure that includes a first inner ring 10, an outer ring 11, and a second inner ring 12. The second inner ring 12 includes a recess 14 directly on a radially outer-lying edge 16 (FIGS. 2 and 3), which recess 14 is annular and rotationally symmetric with respect to a central axis of the wheel bearing unit. In addition the recess 14 is groove-shaped. A first region 18 of the recess 14 is disposed directly on a radial outer side of the second inner ring 12. Furthermore, a second region 19 of the recess 14 is disposed directly on an axial end side 20 of the second inner ring 12.

A seal element 22 of the wheel bearing unit is formed as an O-ring and introduced into the recess 14 over an angle of 360° with respect to the central axis. Furthermore, the wheel bearing unit includes a seal unit 30, which abuts against the second inner ring 12 and the outer ring 11 and seals therebetween. A metal-plate element 24 of the seal unit 30 presses via a rounded edge, which lies radially inward and is disposed end-side, onto the seal element 22 and deforms it.

Figure 3:
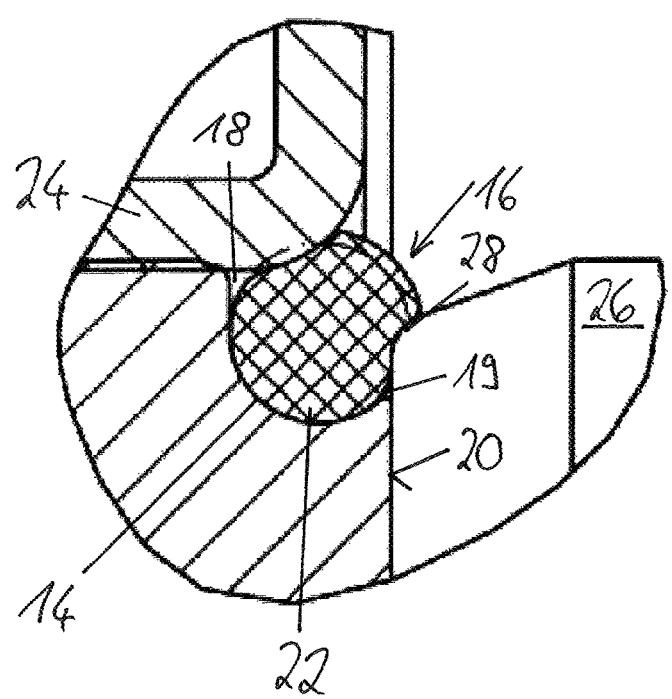
FIG. 3 is an enlarged detail from FIG. 2.

In a final assembled state (FIGS. 2 and 3), the wheel bearing unit is disposed on a journal 26. A shoulder of the journal includes a region 28, which presses against the seal element 22 and also deforms it. Overall the seal element 22 is thus clamped by the metal-plate element 24 and the region 28. An axial cross-sectional surface of the O-ring is therefore no longer circular (FIG. 3).

The wheel bearing unit is thus delivered in a state wherein the seal element 22 is already introduced into the recess and is thus pre-assembled. Here the seal element is already captive since it is attached to the second inner ring by the recess and the metal-plate element. An installation onto the journal is therefore also simplified.

The wheel bearing unit is part of a truck.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved wheel bearing units and assembly methods.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

10 Inner ring
11 Outer ring
12 Inner ring
14 Recess
16 Edge
18 Region
19 Region
20 End side
22 Seal element
24 Metal-plate element
26 Journal
28 Region
30 Seal unit

What is claimed is:

1. A bearing assembly including a wheel bearing unit comprising:
    a first inner ring;
    a second inner ring, the second inner ring including a recess disposed directly on a radially outer edge of the second inner ring;
    an outer ring;
    a plurality of rolling elements located between the second inner ring and the outer ring;
    a seal element located in the recess;
    a seal unit axially disposed between the plurality of rolling elements and a portion of the seal element, the seal unit is radially disposed between the second inner ring and the outer ring, and
    a journal having a shoulder having an edge region formed by a radially extending axial shoulder surface and a radially outwardly facing shoulder surface, wherein the journal and second inner ring are configured such that the edge region of the shoulder of the journal contacts the seal element at a location between a radial upper end and a radially lower end of the seal element, the seal element being clamped by both the seal unit and the edge region of the shoulder of the journal such that a portion of the seal element axially overlaps a portion of the radially outwardly facing shoulder surface of the journal.

2. The bearing assembly according to claim 1, wherein the recess is annular.

3. The bearing assembly according to claim 1, wherein the recess is a groove.

4. A truck including a bearing assembly according to claim 1.

5. The bearing assembly according to claim 1, wherein the recess extends radially inward from the radial outer edge of the second inner ring and radially inward from an axial end side of the second inner ring.

6. The bearing assembly according to claim 5, wherein a portion of the seal element protrudes axially beyond the second inner ring.

7. The bearing assembly according to claim 5 including at least one metal-plate element, which contributes to a deforming of the seal element.

8. The bearing assembly according to claim 5, wherein the seal element is an O-ring.

9. The bearing assembly of claim 5, wherein a portion of the seal element protrudes radially outwardly beyond the second inner ring.

10. The bearing assembly according to claim 9, wherein the bearing unit comprises an L-shaped metal bracket, the L-shaped metal bracket extending radially outwardly from the radially outer surface of the first inner ring, the L-shaped bracket at least partially overlying a portion of the seal element and compressing the seal element.

11. The bearing assembly according to claim 10,
    wherein the wheel bearing unit is mounted on the journal such that another portion of the seal element is compressed between the shoulder and the groove.

12. A pre-assembly method for a wheel bearing unit comprising:
    providing a wheel bearing unit comprising:
        a first inner ring and a second inner ring, the second inner ring including a recess disposed directly on a radially outer edge of the second inner ring;
        an outer ring;
        a plurality of rolling elements located between the second inner ring and the outer ring;
        a seal unit axially disposed between the plurality of rolling elements and a portion of the seal element, the seal unit is radially disposed between the second inner ring and the outer ring,
    inserting a seal element into the recess
    providing a journal having a shoulder having an edge region formed by a radially extending axial shoulder surface and a radially outwardly facing shoulder surface, wherein the journal and second inner ring are configured such that the edge region of the shoulder of the journal contacts the seal element at a location between a radial upper end and a radially lower end of the seal element, the seal element being clamped by both the seal unit and the edge region of the shoulder of the journal such that a portion of the seal element axially overlaps a portion of the radially outwardly facing shoulder surface of the journal.

13. The method according to claim 12, wherein the seal element is an O-ring and the recess is an annular groove.

\* \* \* \* \*